United States Patent Office 3,445,390
Patented May 20, 1969

3,445,390
**METHOD OF HIGH TEMPERATURE LUBRI-
CATION AND FLUID OPERATION**
James A. Brennan, Cherry Hill, N.J., assignor to Mobil
 Oil Corporation, a corporation of New York
No Drawing. Continuation-in-part of application Ser. No.
 420,806, Dec. 23, 1964. This application Dec. 7, 1967,
 Ser. No. 688,655
Int. Cl. C10m 3/44; C07f 7/02
U.S. Cl. 252—49.6                                    6 Claims

ABSTRACT OF THE DISCLOSURE

At very low and very high temperatures, the lubrication of metal surfaces and hydraulic operation are effectively carried out using as the lubricant or fluid, a methyl ($C_6$- to $C_{10}$-alkyl) silicone produced by reacting a straight-chain aliphatic olefin of 6 to 10 carbon atoms with a methyl hydrogen siloxane, having a molecular weight of from about 800 to about 3000 there being no more than one hydrogen atom attached to each silicone atom. The methyl hydrogen siloxane reactant contains from about 10 to about 40 reaction sites available for reaction with the olefin. The fluids used in the method of this invention are further characterized by the fact that no residual Si—H bonds remain in the molecule as measured by infra-red.

Cross-reference to related applications

This application is a continuation-in-part application of copending U.S. application Ser. No. 420,806, filed Dec. 23, 1964.

Background of the invention

*Field of the invention.*—This invention relates to methods for lubricating metal surfaces or for transmitting pressure through an enclosed mechanical hydraulic system. More particularly, it relates to methods of lubricating a moving metal surface or of causing a metal surface to move by applying hydraulic pressure thereto wherein the lubricant or hydraulic fluid is a methyl alkyl silicone fluid.

*Description of the prior art.*—Alkylated silicones or siloxanes have been known both in the forms of solid rubbers or industrial fluids. In U.S. Patent No. 2,970,150, there is described a process of reacting a siloxane containing Si—H bonds with unsaturated compounds. Most of the siloxanes used, however, are low molecular weight siloxanes. Moreover, the resulting reaction products of the examples of this patent contain residual Si—H bonds. It has been found that when a methyl alkyl polysilicone fluid contains residual Si—H bonds, its usefulness at high temperatures may be lost because it forms solid rubbery products. This formation may occur even under storage conditions.

Summary of the invention

In accordance with this invention, there is provided a method of lubricating moving metal parts of an engine or transmitting hydraulic pressure to a mechanical end use under which pressure metal parts are moved, by using as the lubricant or hydraulic fluid a methyl ($C_6$- to $C_{10}$-alkyl) silicone fluid. The fluid is produced by reacting an aliphatic 1-olefin having from 6 to 10 carbon atoms, i.e., hexene-1, octene-1 or decene-1, with a methyl hydrogen siloxane polymer having a molecular weight in the range of from about 800 to about 3000, and preferably from 1000 to 1500, having no more than one hydrogen atom per silicon atom, there being from 10 to about 40, and preferably from 11 to about 20, such Si—H bonds (or reaction sites) available for reaction with the olefin in the methyl hydrogen silicone. The methyl alkyl siloxane polymers of this invention have a kinematic viscosity at 210° F. of from about 6 to about 35 cs.

Description of specific embodiments

As disclosed in the aforementioned copending patent application, the reaction between the representative repeating unit of the silicone polymer and the 1-olefin is believed to take the following form:

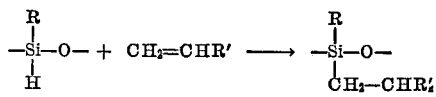

wherein R' is alkyl of 4 to 8 carbon atoms. By limiting the methyl hydrogen siloxane reactant to polymers having a kinematic viscosity at 210° F. of from about 0.75 to about 11 cs. and the average number of Si—H bonds (these being the reaction sites along the silicone polymer chain) of from 11 to 20, the preferred fluids may be prepared.

The olefin reactant is present in a stoichiometric excess, that is, more olefin than Si—H bonds present in the siloxane polymer. Hexene-1 is the most preferred of the olefin reactants. The most preferred methyl hydrogen siloxane has a molecular weight of about 1100 to 1200, with from 14 to 15 reaction sites. The resulting product has excellent physical and chemical properties. The reaction employed in producing the fluids of this invention may be conducted by any means well known to the art, thermally or catalytically.

The preferred fluids permit efficient lubricating or hydraulic operation at high temperatures. They have an autogenous ignition temperature of 750° F. or higher. They are thermally stable and nonvolatile, showing a material loss of less than 0.5% and a decrease in 100° F. viscosity of less than 10%, upon heating the fluid at 700° F. for 1½ hours.

The following examples will illustrate the various aspects of this invention:

Preparation of products

Example 1.—A methyl hydrogen siloxane having a molecular weight of 1120 was reacted with a stoichiometric excess of (1) hexene-1 and (2) octene-1 using a stoichiometric excess of the olefin in each reaction. The general procedure in each of the reactions is as follows: In a suitable reactor excess olefin and a solution of isopropanol containing chloroplatinic acid (about $5 \times 10^{-6}$ mole of platinum per mole of olefin) are mixed together and heated to reflux. Thereafter, the methyl hydrogen siloxane is added and the reaction mixture is maintained at reflux for about 4 hours. The excess olefin is distilled off. The method of reaction is well-known in the art and does not represent part of this invention.

The reaction with hexene-1 and the silicone leads to a methyl hexyl silicone having a molecular weight of 2350, an increase in molecular weight of 1230. The number of reaction sites along the silicone polymer chain is 14.5 (which also indicates the number of moles of 1-hexene added onto the polymer). The kinematic viscosity of this product at 40° F. is 2660 cs. The fluid evidences excellent lubricating properties and hydraulic fluid properties. The reaction of the same methyl hydrogen silicone polymer with octene-1 resulted in a product having a molecular weight of 2700, an increase of 1580 in molecular weight, or 14.0 reaction sites.

Evaluation of products

These products were evaluated in the autogenous ignition temperature test. This test involves immersing a flask in a heated bath, the temperature of which is increased at a constant rate. At every 20° F. rise in temperature, one or two drops of the test sample are introduced into the test flask until the temperature increment at which the sample will spontaneously ignite is attained. Once this increment has been established, the autogenous ignition temperature (AIT) is found by lowering and raising the temperature until the minimum temperature which will cause one to two drops of sample to ignite is ascertained.

The products of the above example were also tested for thermal stability at 700° F. Twenty grams of a sample of known viscosity are placed in a glass ampule and purged with nitrogen for two minutes. This container is fitted into an aluminum block at 700° F. and held for 90 minutes. During this time, half a pound of nitrogen is passed over the open tip of the ampule. The evaporation loss, the neutralization number and the kinematic viscosity at 100° F. are thereafter measured, using the usual ASTM methods. The percent loss in kinematic viscosity at 100° F. is deemed a measure of the thermal stability of the sample. Both of the products of Example I had an AIT of over 825° F. The percent loss in kinematic viscosity was from 1.3% to 3.7%, and the precent loss in material by evaporation ranged from 0.32 to 0.48.

Example 2.—A methyl hydrogen siloxane polymer having a molecular weight of 2015 is reacted with hexene-1 in the presence of 0.50% by weight of reaction mixture of 1% platinum-on-charcoal. The product has a molecular weight of 3640. This represents an increase of 1625 in molecular weight, indicating that 19.1 moles of olefin were added to the silicone. The AIT is 840° F., percent loss in kinematic viscosity of 6.6% and the material loss 0.32%.

The results of these examples show that the specific limitations of the methyl hydrogen siloxane polymers described in this invention are of critical importance. The number of reaction sites on the polymer chain should be in the range of about 10 to 40 and preferably 11 to 20 in order to obtain products having the desired properties. Using silicone polymers having less or more reaction sites either lead to products which have a lower AIT or which suffer either excessive loss in kinematic viscosity or material loss at high temperatures. The products used in the method of this invention are capable of performing at extremely high temperatures as lubricants or as hydraulic fluids. They do not form solid materials after long use at such temperatures, but retain their stability and utility over long periods of service.

The hereinabove description includes examples and illustrations intended to depict various aspects of the invention and is not intended as a limitation thereof except as claimed in the appended claims.

I claim:
1. A method of causing a metal surface to move in conjunction with a fluid having lubricant and pressure-transmitting properties which remains stable at temperatures of 700° F. and higher comprising (a) contacting said metal surface with a methyl alkyl siloxane fluid having an autogenous ignition temperature of at least 750° F. and undergoing a maximum change of 100° F. kinematic viscosity of 10%, after extended exposure at 700° F., said fluid being produced by the addition reaction of (1) a stoichiometric excess of a straight-chain, 1-olefin having 6 to 10 carbon atoms and (2) a methyl hydrogen siloxane polymer having a molecular weight from about 800 to about 3000 and from 10 to 20 silicon-hydrogen bonds which constitute the reaction sites on the siloxane polymer with which the 1-olefin is capable of complete reaction and a maximum of one hydrogen atom for each silicon atom, and (b) moving said fluid-contacted metal surface.

2. A method of claim 1 wherein the fluid is produced from hexene-1 and a methyl hydrogen silicone polymer.

3. The method of claim 2 wherein the molecular weight of the methyl hydrogen siloxane polymer is from 1000 to 1500.

4. The method of claim 3, wherein the molecular weight is from about 1100 to 1200.

5. The method of claim 1 wherein the number of reaction sites along the methyl hydrogen siloxane is in the range of from 14 to 15.

6. The method of claim 1 wherein the fluid is produced from octene-1 and a methyl hydrogen silicone.

References Cited

UNITED STATES PATENTS

| | | | |
|---|---|---|---|
| 2,398,187 | 4/1946 | McGregor et al. | 252—78 |
| 2,823,218 | 2/1958 | Speier et al. | 260—448.2 |
| 2,970,150 | 1/1961 | Bailey | 260—448.2 XR |

OTHER REFERENCES

Schiefer et al.: Am. Chem. Soc., Div. Petr. Chem., preprint, Cleveland meeting, Apr. 5–14, 1960, pp. B159–B169.

DANIEL E. WYMAN, *Primary Examiner.*

W. CANNON, *Assistant Examiner.*

U.S. Cl. X.R.

252—78; 260—448.2